United States Patent [19]

Nakamura

[11] 4,424,632
[45] Jan. 10, 1984

[54] SYNTHETIC RESIN PELLET DEHYDRATING APPARATUS

[76] Inventor: Kensaku Nakamura, 272-1, Besso-cho, Matsubara-shi, Osaka, Japan

[21] Appl. No.: 326,605
[22] Filed: Dec. 2, 1981
[51] Int. Cl.³ .............................................. F26B 17/10
[52] U.S. Cl. ..................................... 34/57 R; 34/10; 34/82; 209/250
[58] Field of Search .................. 34/10, 57 R, 69, 82; 210/433.1; 209/250, 281, 300, 305

[56] References Cited

U.S. PATENT DOCUMENTS

| 1,373,685 | 4/1921 | Torrence | 209/250 |
| 1,961,921 | 6/1934 | Bowen | 209/250 |
| 3,306,671 | 2/1967 | Leeman | 209/250 |

Primary Examiner—Larry I. Schwartz
Attorney, Agent, or Firm—Moonray Kojima

[57] ABSTRACT

An apparatus for dehydrating synthetic resin pellets comprising a plurality of interconnected truncated conically shaped dehydrating screens disposed vertically with their smaller diameters being uppermost, whereat wet pellets are forcibly directed so that moisture on the surface thereof will be removed by the screens. Blower means are provided for providing upward flowing air to move the wet pellets through the interconnected screens.

2 Claims, 3 Drawing Figures

SYNTHETIC RESIN PELLET DEHYDRATING APPARATUS

This invention is concerned with an apparatus for dehydrating synthetic resin pellets wherein wet pellets are forced to collide repeatedly with a dehydrating screen along a path into a hopper storage tank.

BACKGROUND OF THE INVENTION

In order to dehydrate a quantity of wet resin pellets, use is made conventionally of centrifugal force, according to which a dehydrating bascket containing a quantity of wet resin pellets is forcibly rolled and then the pellets are taken out of the bascket so that it is not possible to effect continuously the dehydrating operation, giving rise to the disadvantages that the dehydrating operational efficiency is very low and the treated pellets cannot be completely dried up.

OBJECTS OF THE INVENTION

Accordingly, the present invention has been made to eliminate the above-mentioned drawbacks and disadvantages, and has as one of its main objects the provision of a synthetic resin dehydrating apparatus having a plurality of cylindrical dehydrating screen means provided midway of a passageway for transferring the pellets so as to force the same pellets to collide repeatedly with the screens thereby completely remove a quantity of water stuck to the outer surface of each resin pellet.

Another object of the invention is to provide a synthetic resin pellet dehydrating apparatus capable of dehydraing a greater quantity of pellets in a shorter length of time than the conventional types, which apparatus is adapted to dehydrate the pellets in a dehydrating means and then transfer the treated pellets into a hopper storage tank.

Another object of the invention is to provide a synthetic resin pellet dehydrating apparatus adapted so that when a quantity of dehydrated pellets are put into a hopper storage tank, they are brought into contact with a dehydrating screen mounted on the upper portion of the hopper storage tank thereby completely dehydrating the pellets.

A further object of the invention is to provide a synthetic resin dehydrating apparatus provided with a hopper storage tank which can store a quantity of resin pellets and wherein the pellets can be dried up by means of an air current moving upwardly.

A still further object of the invention is to provide a synthetic resin pellets dehydrating apparatus wherein the hopper storage tank has a mouth intercommunicated with an intake mouth of a blower means through a hose so that air can be blown into a plurality of interconnected dehydrating screens and exhausted out of the screens and into the storage tank by means of a single blower means, thus making it possible for a strong blowing force to be provided by a small-size blower means.

BRIEF DESCRIPTION OF THE ACCOMPANYING DRAWINGS

In the drawings,

FIG. 3 is a cross sectional elevation taken on the line of A—A thereof.

DETAILED DESCRIPTION OF INVENTION

Figure 1:
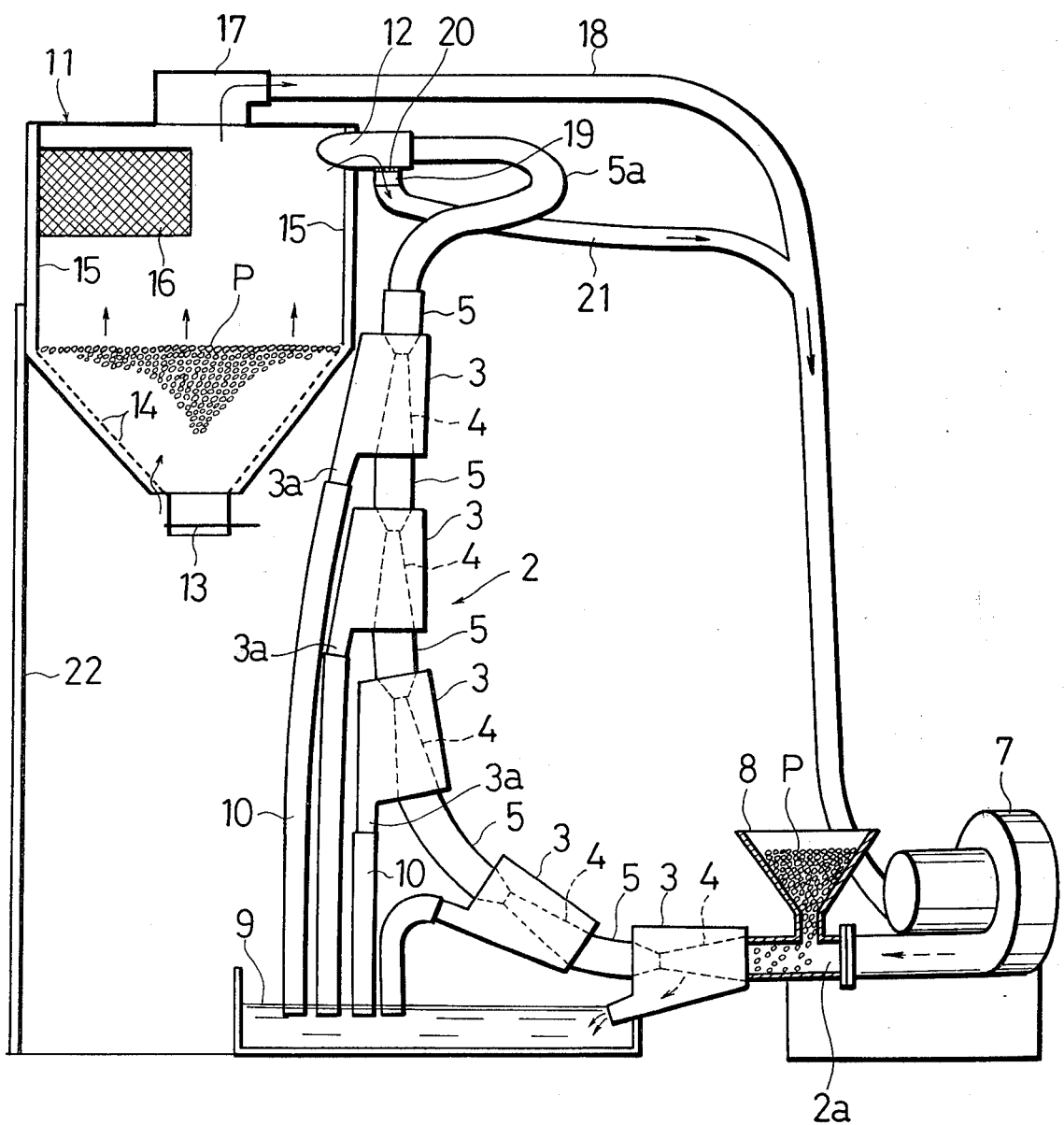
FIG. 1 is a cutaway side elevational view partially showing a synthetic resin pellet dehydrating apparatus in accordance with the invention.
Figure 2:
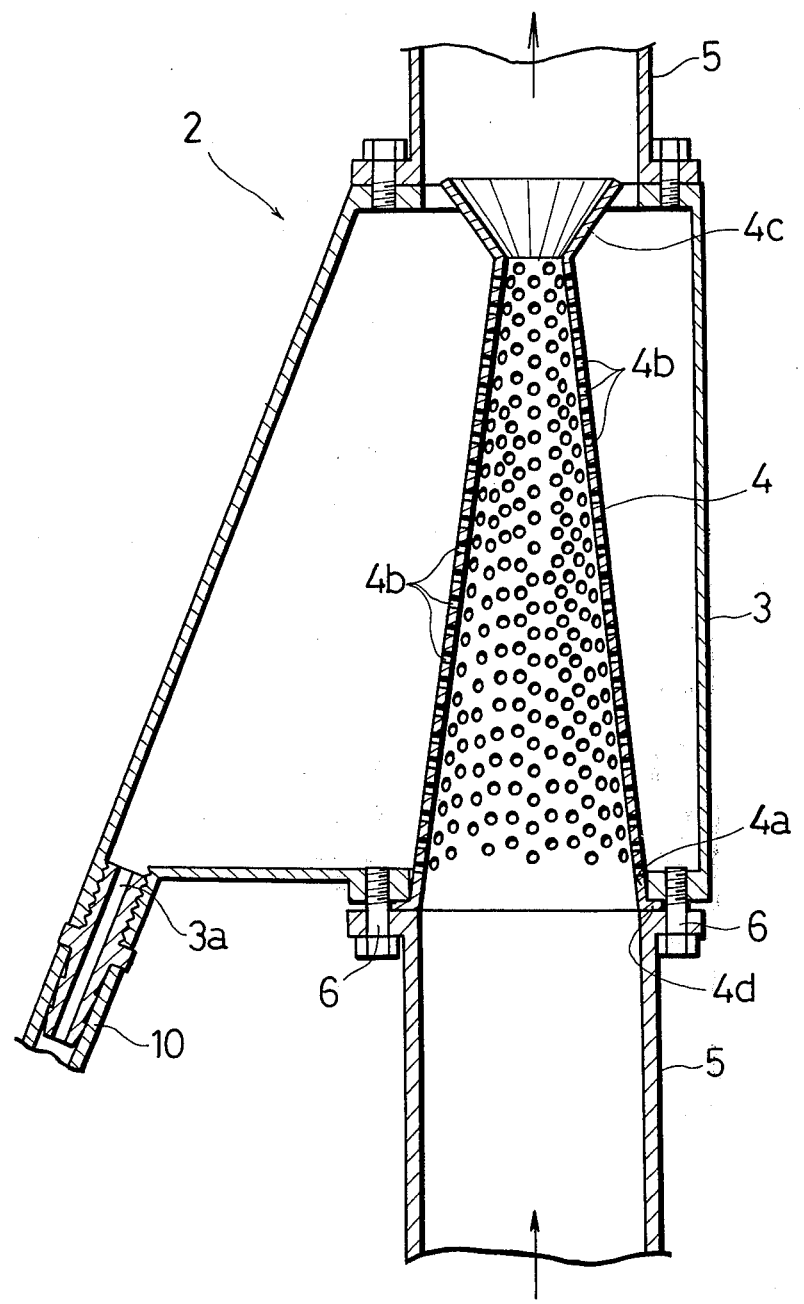
FIG. 2 is a vertical cross-sectioned elevation of a cylindrical screen means applied to the invention.

Setting forth now in detail a preferred embodiment of the invention with reference to the accompanying drawings, a synthetic resin pellet dehydrating apparatus as depicted having a passageway 2 for transferring and dehydrating pellets P. The passageway 2 comprises a plurality of water pipes 3 each internally provided with a truncated conically shaped dehydrating screen 4, a flange 5 through which water pipes 3 are connected to each other and a pipe 5a which is adapted to guide pellets P into a hopper storage tank 11 to be described later.

The dehydrating screen 4 is formed substantially into a truncated conical shape in vertical cross section, being made largest in diameter at the lowermost edge portion 4a thereof and gradually reduced in diameter toward the uppermost edge portion opposite to said portion 4c. Circumferentially of dehydrating screen 4 there are provided a plurality of dehydrating hole 4b while an opening portion 4c is provided on the top of dehydrating screen 4, which portion 4c is not bored with any hole. The lowermost edge portion 4a of the dehydrating screen 4 is provided with a guard 4d which is fixedly held between the flange 5 and the water pipes 3 by means of a bolt 6.

To the lower end 2a of passageway 2 there are connected a blower means 7 and a feeding hopper means 8 adapted to feed a quantity of wet resin pellets P. Each of water pipes 3 is provided with a draining hole 3a intercommunicated to a water storage tank 9 through a pipe 10.

According to the invention a quantity of dehydrated resin pellets P is provisionally stored in a hopper storage tank 11 which has a casting hole 12 connected to a guide pipe 5a extending upwardly of the flange 5, being provided in the lower portion of tank 11 with a draining hole 13.

The hopper storage tank 11 is formed, as the whole, with double walls as shown clearly in FIG. 1 of the accompanying drawings. The lowermost inner wall of storage tank 11 is provided with a plurality of vents 14 while the inner wall 15 opposite to casting hole 12 has a dehydrating screen 16 extensively stretched thereon. The upper portion of hopper storage tank 11 is provided with an opening 17 which is connected to hose 18 thereby being connected to an intake hole of blower means 7.

Likewise the lower portion of casting hole 12 is also provided with an opening 19 through a screen 20 and connected to the intake hole of blower means 7 by means of pipe 21. The hopper storage tank 11 is upwardly supported by means of a support member 22.

Description will now be made of the operation of the synthetic resin pellet dehydrating apparatus embodied in accordance with the invention, wherein when a quantity of synthetic resin pellets P wet with water are fed into the feeding hopper means 8, wet pellets P are forced into the passageway 2 under pressure of said air current from the blower means 7 thereby being forcibly transferred through the passageway 2 comprising the interconnected dehydrating screens 4. Thus the resin pellets P within passageway 2 are transferred through the water pipes 3 and the dehydrating screen 4. In this case, however, the pellets P are caused to violently collide with an inner inclined surface of said dehydrating screen 4 since the latter screen is formed to be gradually smaller in diameter or internally inclined toward its uppermost edge in the way of the passageway 2 as has been mentioned just in the foregoing, so that the water stuck to the outer surface of the pellets are repelled off the pellets by the impact of the pellets against the dehydrating screen 4. The repelled water is made to pass through the meshes of the dehydrating holes 4b and collected into the water pipes 3, thereafter being drained by gravity into the water storage tank 9 through the water pipes 10.

On the other hand, a quantity of dehydrated resin pellets P are fed upward through flange 5 and pipe 5a to the casting hole 12 of the hopper storage tank 11 along the inner surface of the dehydrating screen 4. Thereafter resin pellets P are repeatedly dehydrated in each of said dehydrating screens 4 until they reach guide pipes 5a and screen 19 wherein they are further and completely dehydrated through action of air which is drawn by means of the blower means 2.

In the above-mentioned dehydrating operation, the outlets of each screen 3 and its adjacency in the passageway are structurally liable to generate a vortex current to permit the resin pellets P to remain thereon. However, the dehydrating means of the invention is so constructed that air current flow is always effected around the outlets of the passageway 2 so that no vortex current of pellets with the least quantity of resin pellets accumulated on the outlets, thus permitting all the quantity to smoothly pass through the passageway.

All the quantity of resin pellets P repeatedly dehydrated as in the above-mentioned manner are forcibly transferred into the hopper storage tank 11 through the casting hole 12. Thus the resin pellets P rollingly move down from the inner upper portion of the hopper storage tank 11 and are further dehydrated on the dehydrating screen 16 stretched in the inner wall thereof wherein said pellets P are dehydrated by similar action as that of dehydrating screens 4 and finally dropped into the hopper storage tank 11.

The tank 11 has its inner lowermost wall portion bored with a plurality of vents 14 which are adapted to normally pass air from opening 13 and upwardly through holes 17, as shown by the arrows by means of suction force of blower means 7 so that there is generated an upward air current within the storage tank 11. This results in the resin pellets P becoming completely dried up by the air current while they are provisionally stored in the hopper storage tank 11.

What is claimed is:

1. A resin pellet dehydrating apparatus comprising
   a plurality of interconnected dehydrating chambers having an entry end and an exit end, and positioned to be substantially vertically oriented with one chamber on-top of the next adjacent chamber and with the entry end at the bottom and the exit end at the top, each said chamber comprising a truncated conically shaped dehydrating screen for removing water from wet pellets and means for collecting and draining said removed water, each said screen being connected and disposed to each other so that the direction of travel of wet pellets will be upwardly and from a larger diameter portion toward a smaller diameter portion of each screen;
   means for forcibly feeding wet pellets mixed with air into said entry end of said chambers, whereby said pellets are forcibly directed upwardly against said screens thereby to cause moisture on the surface of said wet pellets to be removed by said screen and drained by said means for collecting, said wet pellets moving successively through each chamber to exit at said exit end, and wherein said means for forcibly feeding comprises a blower means for supplying air under pressure and feeding means connected between said blower means and said entry end for feeding said wet pellets, whereby air supplied by said blower means carries under pressure said wet pellets into said entry end of said interconnected chambers;
   storage means connected to said exit end of said interconnected chambers, for storing substantially dried pellets after dehydration operation of said screens, said storage means having an opening at the bottom thereof, an opening at a side wall thereof, an opening at the top thereof, an outer wall and a vented inner wall, said exit end being connected to said opening at said side wall; and
   pipe means connected between said opening at said top of said storage means and said blower means, whereby air is drawn by said blower means through said opening in said bottom of said storage means, through said vented inner walls, through said opening at said top of said storage means, through said pipe means, through said blower means, through said feeder means whereat said wet pellets are mixed therewith, through said entry end of said interconnected chambers and upwardly through said interconnected chambers, whereat said wet pellets are forcibly directed against said truncated conically shaped screens to remove moisture from the surface of said pellets, through said exit end of said chambers, and through said opening in said side wall of said storage means into said storage means, whereby said pellets are substantially dried in said chambers and placed in said storage means.

2. The apparatus of claim 1, wherein said storage means further comprises a dehydrating screen disposed near the upper portion thereof and opposite said opening in said side wall whereby said substantially dried pellets are directed against said dehydrating screen in said storage means thereby to remove any remaining moisture from the surface of said pellets.

* * * * *